United States Patent
Link

(10) Patent No.: US 7,553,391 B2
(45) Date of Patent: *Jun. 30, 2009

(54) METHOD AND DEVICE FOR MANUFACTURING AN ENDLESS BAND OF PLASTIC FOR AN INTERMEDIATE CARRIER BAND

(75) Inventor: Robert Link, Munich (DE)

(73) Assignee: Oce Printing Systems GmbH, Poing (DE)

( * ) Notice: Subject to any disclaimer, the term of this patent is extended or adjusted under 35 U.S.C. 154(b) by 342 days.

This patent is subject to a terminal disclaimer.

(21) Appl. No.: 11/266,669

(22) Filed: Nov. 3, 2005

(65) Prior Publication Data

US 2006/0054271 A1  Mar. 16, 2006

Related U.S. Application Data

(62) Division of application No. 10/381,321, filed on Mar. 24, 2003, now Pat. No. 7,318,878.

(51) Int. Cl.
*B29D 17/00* (2006.01)
*B31F 5/00* (2006.01)

(52) U.S. Cl. ............ 156/272.2; 156/137; 156/157; 156/304.1; 156/502

(58) Field of Classification Search ........... 156/272.2, 156/157, 228, 272.8, 275.1, 304.1, 304.6, 156/309.6, 502, 64, 137
See application file for complete search history.

(56) References Cited

U.S. PATENT DOCUMENTS

| | | | | |
|---|---|---|---|---|
| 3,723,261 A * | 3/1973 | Byers et al. | ............... | 205/285 |
| 4,197,149 A | 4/1980 | Freitag et al. | | |
| 5,007,689 A * | 4/1991 | Kelly et al. | ............... | 359/350 |
| 5,240,532 A * | 8/1993 | Yu | ............... | 156/137 |
| 5,997,974 A * | 12/1999 | Schlueter et al. | ............... | 428/58 |
| 6,328,922 B1 * | 12/2001 | Mishra et al. | ............... | 264/322 |
| 6,368,440 B1 * | 4/2002 | Yu et al. | ............... | 156/137 |
| 6,387,209 B1 * | 5/2002 | Nettesheim | ............... | 156/379.6 |
| 6,652,691 B1 * | 11/2003 | Yu et al. | ............... | 156/137 |
| 7,318,878 B2 * | 1/2008 | Link | ............... | 156/272.8 |
| 2001/0037580 A1 * | 11/2001 | Tondorf | ............... | 33/706 |

FOREIGN PATENT DOCUMENTS

| | | |
|---|---|---|
| DE | 37 13 527 A1 | 11/1988 |
| DE | 195 16 726 A1 | 11/1996 |
| DE | 19832168 A1 * | 1/2000 |

(Continued)

OTHER PUBLICATIONS

Machine Translation of EP 705682 A1, Nov. 27, 2007.*

(Continued)

*Primary Examiner*—John L Goff
*Assistant Examiner*—Daniel McNally
(74) *Attorney, Agent, or Firm*—Schiff Hardin LLP

(57) ABSTRACT

A method and apparatus for producing continuous belts is disclosed. The belts are formed from plastic films and are used as transfer belts in electrographic printers and copiers. The ends of the film are welded together by abutting their front faces and the ends are held together under pressure while being heated by radiation to a temperature to cause welding of the ends.

24 Claims, 4 Drawing Sheets

FOREIGN PATENT DOCUMENTS

| | | | |
|---|---|---|---|
| EP | 705682 A1 | * | 4/1996 |
| GB | 2 278 571 | | 12/1994 |
| JP | 4-224826 | | 8/1992 |
| WO | WO 92/07704 | | 5/1992 |

OTHER PUBLICATIONS

EWi WELDNET®, "Hot Plate Welding", http:///www.ewi.org/matjoin/plastics/hotplace.html, Jul. 17, 2000.

EWi WELDNET®, "Through-transmission Infrared Welding TTIR", http:///www.ewi.org/matjoin/plastics/ttir.html.

EWi WELDNET®, "Infrared Heating", http:///www.ewi.org/matjoin/plastics/infrared.html.

Japanese Abstract, Publication No. 04224826, Publication Date: Aug. 14, 1992.

* cited by examiner

METHOD AND DEVICE FOR MANUFACTURING AN ENDLESS BAND OF PLASTIC FOR AN INTERMEDIATE CARRIER BAND

This is a Divisional of application Ser. No. 10/381,321, now U.S. Pat. No. 7,318,878, filed March 24, 2003.

BACKGROUND OF THE INVENTION

1. Field of the Invention

The present invention is directed to a method and to a device for manufacturing an endless band of plastic for an intermediate carrier band in an electrographic printer or copier.

2. Description of the Related Art

Intermediate carrier bands are utilized in electrographic printers or copiers in order to generate latent electrostatic images and/or to offer a carrier for toner images to be transfer-printed. For example, an endless band with a photoconductive layer, for example an OPC band (Organic PhotoConducting material) is employed as intermediate carrier band, this forming a corresponding electrostatic charge image, what is referred to as a latent charge image, by being exposed according to a predefined image pattern. This latent charge image is then inked with toner material in a developer station; later, this toner image is transferred onto paper or some other recording medium and is fixed thereon.

An endless intermediate carrier band can also serve as transfer band for collecting toner images and conveying these to a transfer printing location. Given, for example, a multi-color printing, a first toner image of a first color is transferred onto the intermediate carrier band. Subsequently, a second toner image with a second color is transferred onto this first toner image, etc. The multi-colored toner images on the intermediate carrier band superimposed on one another in this way are then conveyed to a transfer printing station and transferred onto the recording medium thereat and fixed.

Ends of a plastic film must be connected to one another for manufacturing an endless intermediate carrier band. The weld that thereby arises can be the cause of numerous disruptions. For example, a thickening along the weld leads to increased wear due to circulation of the intermediate carrier band. Moreover, the material properties can have been changed in the region of the weld, so that this region can generally not be used as a photoconductive region or as a region for the acceptance of a toner image.

German Patent Document DE 19 832 168 A1 discloses a method and an apparatus for welding thermoplastic synthetics using laser light. The ends of a thermoplastic plastic film are arranged abutting and can be held with the assistance of a retainer elements and a silica glass plate. Laser light is coupled in via the silica glass plate, as a result whereof the ends of the film are welded to one another. Special measures for producing a uniform weld are not disclosed.

German Patent Document DE 19 516 726 A1 discloses a method for shaping and closing a folding box, whereby plastic layers for packing a welded to one another upon employment of radiation. The welding process is promoted by applying pressure.

German Patent Document DE 3 713 527 A1 discloses the welding of plastic parts whose ends are place flush against one another. The plastic parts are provided with profiles at their ends, so that these profiles can engage in one another. The ends with the profiles are then welded to one another with the assistance of a laser welding device.

European Patent Document EP-A-0 705 682 discloses a method for the thermal joining of substrates of polymers, whereby at least one substrate is coated with a medium that absorbs microwaves. The substrates are then welded to one another in a microwave field.

Internet information of the EWi WELDNET company with the title "Hot Plate Welding", obtainable under http://www.ewi.org/matjoin/plastics/ttir.html; http://www.ewi.org/matjoin/plastics/hotplate.html; http://www.ewi.org/matjoin/plastics/infrared.html, teaches that plastic parts be firmly joined to one another by means of a butt joint welding. A heating element is thereby placed between the contact surface of the parts to be welded, the surfaces lying opposite one another at their end faces, and the contact surface are heated up to the melting phase. Subsequently, the heating element is removed and the contact surfaces residing opposite one another are pressed against one another. A durable connection between the contact surfaces is provided after cooling. Such a method, however, has the disadvantage that a raised weld projecting out of the surfaces of the parts welded to one another arises at the contact surfaces.

An overlap welding method is disclosed under the titles "Through-transmission Infrared Welding TTIR" or, respectively, "Infrared Heating" in the aforementioned Internet information. The ends of plastic parts to be welded are thereby placed on top of one another and heated up to the melting phase by infrared radiation or laser emission from a radiation source that is not in contact with the parts to be welded. One application of this method is the welding of a part that is transparent for the radiation to a part that is impermeable to the radiation, whereby the welding arises in the region of the surfaces of the parts to be welded that lie on top of one another. A further application of this method is the welding of plastic films lying on top of one another at ends with the assistance of a thin intermediate layer. The method is not suitable for the manufacture of endless bands.

SUMMARY OF THE INVENTION

The present invention provides a method and a device for manufacturing an endless band of thermoplastic synthetic whose surfaces allows high usage given low wear.

This is achieved for a method for manufacturing an endless band of plastic for an intermediate carrier band in an electrographic printer or copier, whereby the ends of a thermoplastic plastic film that comprises at least the width of a standard printing format, have their end faces placed abutting one another, the ends of the plastic film are heated by radiation to a temperature required for the welding, and whereby a respective pressing surface is arranged at both sides of the ends, the length of the pressing surface at least corresponding to the width if the plastic film and this pressing the surfaces of the ends against one another such that, when the plastic material of the end faces of the ends residing opposite one another melts, the spacing of the pressing surfaces defined by the thickness of the cold plastic film is preserved.

According to the invention, the pressing surfaces have a spacing from one another that is defined by the thickness of the cold plastic film. When the adjoining ends of the plastic film are heated, the molten mass cannot become thicker than prescribed by the spacing of the two pressing surfaces from one another. The cold weld along the entire width of the plastic film therefore has the same thickness as the plastic film itself. The weld therefore has no raised shape and is subject to only low wear even given a high usage of the endless band as intermediate carrier band in a printer or copier. As has been shown in practice, the weld is so uniform that this region can be fully utilized as a functional surface given the function as an intermediate carrier band. As, for example, a photoconductive intermediate carrier band, the region of the weld can be coated with a photoconductive layer within which latent image structures form due to exposure. This region of the weld can likewise be utilized given employment of the endless band as an intermediate carrier band for the transfer of toner images, for example for superimposed toner images as well. It thus follows that an endless intermediate carrier band manufactured in this way can have its surface fully utilized, as a result whereof its overall length can be short and further design advantages derive in the structuring of the printer or copier.

The plastic film has at least the width of a standard printing format, i.e. at least the width of a DIN A4 sheet. The pressing surfaces should also be correspondingly designed in terms of their respective length. As a result of the guidance by the pressing surfaces, it is possible to produce a uniform and functional weld along this relatively great width. The force exerted on the pressing surfaces is to be empirically determined. It is dependent on the type of plastic film, on the thickness of the plastic film and on the length of the weld to be produced.

According to a further aspect of the invention, a device is recited for manufacturing an endless band of thermoplastic plastic for an intermediate carrier band in an electrographic printer or copier. The advantages obtainable with this device agree with the advantages described for the method.

BRIEF DESCRIPTION OF THE INVENTION

The invention is explained in greater detail below on the basis of exemplary embodiments according to the Figures of the drawings.

DETAILED DESCRIPTION OF THE INVENTION

Figure 1:
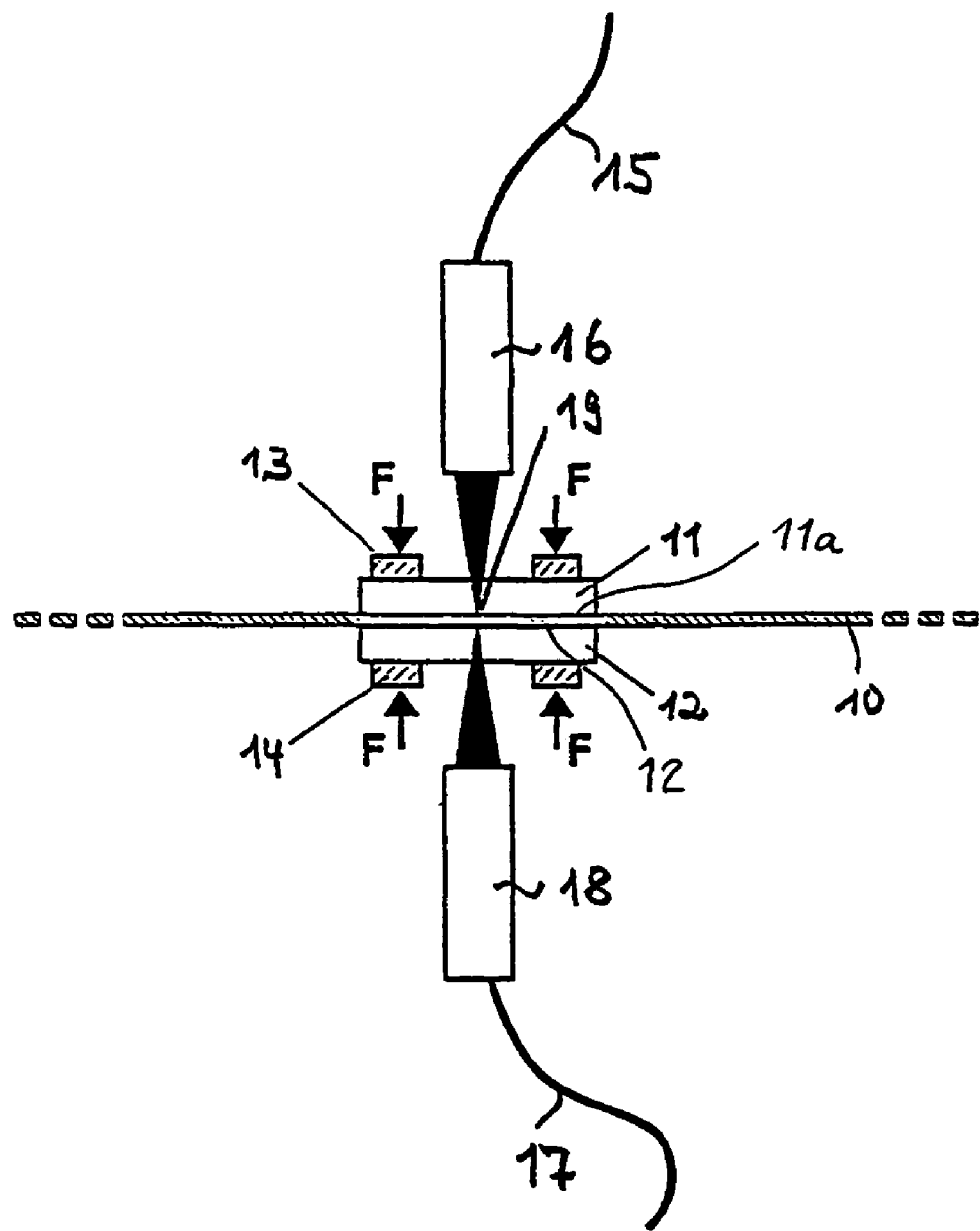
FIG. 1 is a schematic illustration of a first exemplary embodiment of an inventive device.

Given the exemplary embodiment according to FIG. 1, a thermoplastic plastic film 10 is placed between a transparent mounting element, for example a glass pane 11, and a transparent counter-mounting element, for example also a glass pane 12, being placed such that the film ends have their end faces lying exactly blunt against one another. Pressing frames 13 and 14 are provided for fixing the plastic film 10 as well as for securing a smooth, non-raised weld, these exerting a prescribed force F onto the glass panes 11 and 12 and, thus, on to the plastic film 10. The flat surfaces of the glass panes 11 and 12 lying against the plastic film 10 form planar pressing surfaces 11a and 12a. Alternatively, these pressing surfaces 11a and 12a can also be concentric, for example cylindrical surfaces. The corresponding glass panes are then elements of generated cylindrical surfaces. In a direction perpendicular to the paper plane, the plastic film has a width of at least the width of a standard printing format, for example DIN A4. The glass panes 11 and 12 have a length that is greater than this width.

Via radiation-conducting fibers 15 and 17 as well as focussing optics 16 and 18, radiation is supplied from radiation sources (not separately shown) for heating the plastic film 10 beyond the melting point in the region of the adjoining film ends. A weld 19 arises between the film ends as a result thereof. The radiation sources are preferably laser radiation sources, for example instance diode lasers, solid-state lasers, gas lasers or laser diode arrays. Dependent on the absorptivity of the material of the plastic film 10, a specific part of the radiation is absorbed and converted into heat. The pressing surfaces 11a and 12a have a spacing from one another that is determined by the thickness of the plastic film 10 in its cold condition. This spacing is preserved when the ends of the plastic film 10 are heated and they melt, i.e. the force F is selected correspondingly high. The molten material then distributes along the bluntly abutting ends with a thickness corresponding to this spacing.

As a result of simultaneous irradiation of the plastic film 10 from both sides via the focussing optics 16 and 18, a uniform weld 19 can be achieved over the entire thickness of the plastic film 10, which is especially advantageous given film materials with good absorbency. The counter-mounting element 12 is then composed of a material that is transparent for the radiation, for instance glass. This is particularly advantageous given film materials with a small penetration depth of the radiation that is less than half the film thickness. A noteworthy transmission part of the radiation is then no longer present.

For improving the quality of the welding process and for compensating film material fluctuations, it is also expedient to measure the temperature in the region of the weld 19. In a control circuit, the temperature can then be kept constant at a defined value by modifying the radiation capacity.

Figure 2:
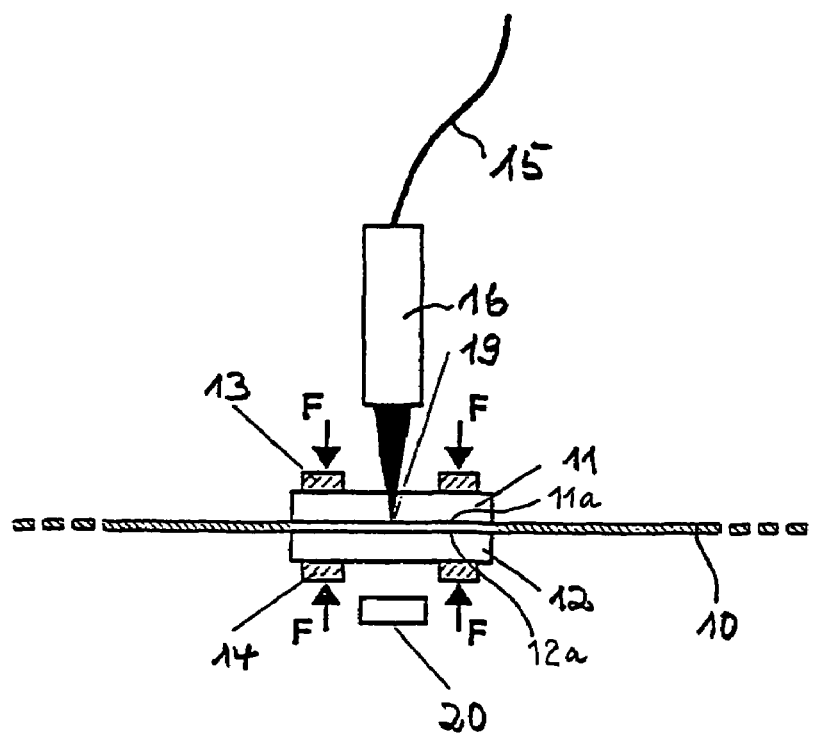
FIG. 2 is a schematic illustration of a second exemplary embodiment of an inventive device.

In the exemplary embodiment according to FIG. 2, wherein identical elements are provided with the same reference characters, as in the other Figures, a radiation source is provided at only one side of the plastic film 10 as well as the mounting element 11 and the pressing frame 13, the radiation source supplying radiation for the weld 19 via the radiation conducting fiber 15 and the focussing optics 16.

Given a material of the plastic film 10 that is largely impermeable for the radiation and a transparent counter-mounting element 12, a check is additionally implemented in this exemplary embodiment as to whether a gap is still present between the ends of the plastic film 10 to be welded. To this end, a radiation detector 20, for example a photodiode, is arranged at that side of the plastic film 10 facing away from the irradiated side, the radiation detector 20 acquiring a radiation part that potentially passes through an existing gap. The radiation part that passes through is nearly zero only given an exact positioning of the ends of the plastic film. The exact positioning of the ends of the plastic film 10 can be implemented manually or automated, whereby the radiation part that passes through should be minimal.

In a further exemplary embodiment, the thickness of the plastic film 10 and the radiation delivered by the radiation sources 15 and 16 are matched such to one another that the optical penetration depth of the radiation is less than or equal to half the thickness of the plastic film 10. It is thereby assured that sufficient energy can be supplied to the plastic film 10 in order to be able to correctly weld it.

For improving the efficiency, one of the mounting elements 11 and 12, preferably the counter-mounting element 12, can be fashioned to be reflective at the appertaining pressing surface 12a. Transmitted radiation is then reflected back into the plastic film 10. The mounting element 12 can, for example, be fashioned as a mirror or as a polished metal sheet, preferably a copper or aluminum sheet, or can comprise a reflection-coated material.

Figure 3:
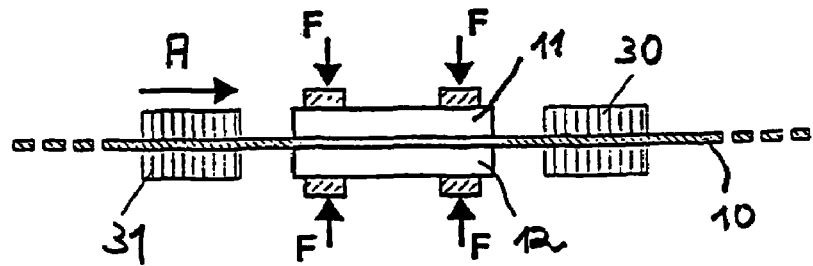
FIG. 3 is a schematic illustration of a part of an inventive device that can be additionally employed given the exemplary embodiments according to FIGS. 1 and 2.

In the above-described exemplary embodiments according to FIGS. 1 and 2 as well as in the exemplary embodiment according to FIG. 3 that is yet to be described, the mounting element 11 and the counter-mounting element 12 can be provided with an anti-adhesion coating (not separately shown), for example Teflon or a hydrophobic DLC coating, at the side of the plastic film 10. A sticking of the plastic film during the welding process is thus avoided.

In order to assure a qualitatively high-grade weld given the device according to FIG. 2 with an irradiation from only one side, the plastic film 10 can also be turned over, so that an irradiation from both sides ensues successively.

In the exemplary embodiment according to FIG. 3, wherein identical elements are provided with the same reference characters as in FIGS. 1 and 2, an additional clamping of the plastic film 10 is provided with the assistance of a rigidly seated clamp element 30 and a movable seated clamp element 31. The motion of these clamp element 30 and 31 for pressing the end of the plastic film 10 together is indicated with an arrow A. In other exemplary embodiments, both the clamp element 30 as well as the clamp element 31 can be movable seated. The quality, particularly the strength of the weld, can be improved by pressing together with the assistance of the clamp elements 30, 31.

The inventive device with the plastic film 10 fixed in it can be moved past under the focussed radiation in a direction perpendicular to the plane of the drawing with a linear table. It is likewise possible to move the radiation across the film region that is to be welded and that is fixed in the inventive device. However, the radiation source, i.e. the radiation-conducting fiber 15 or, respectively, 17 as well as the focussing optics 16 or, respectively, 18 must then be fashioned movable. Further, the radiation can be deflected, for example with a galvanometer mirror, or can be expanded, for example with a linear optics. In the latter case, a simultaneous welding over the entire film width is possible.

Figure 4:
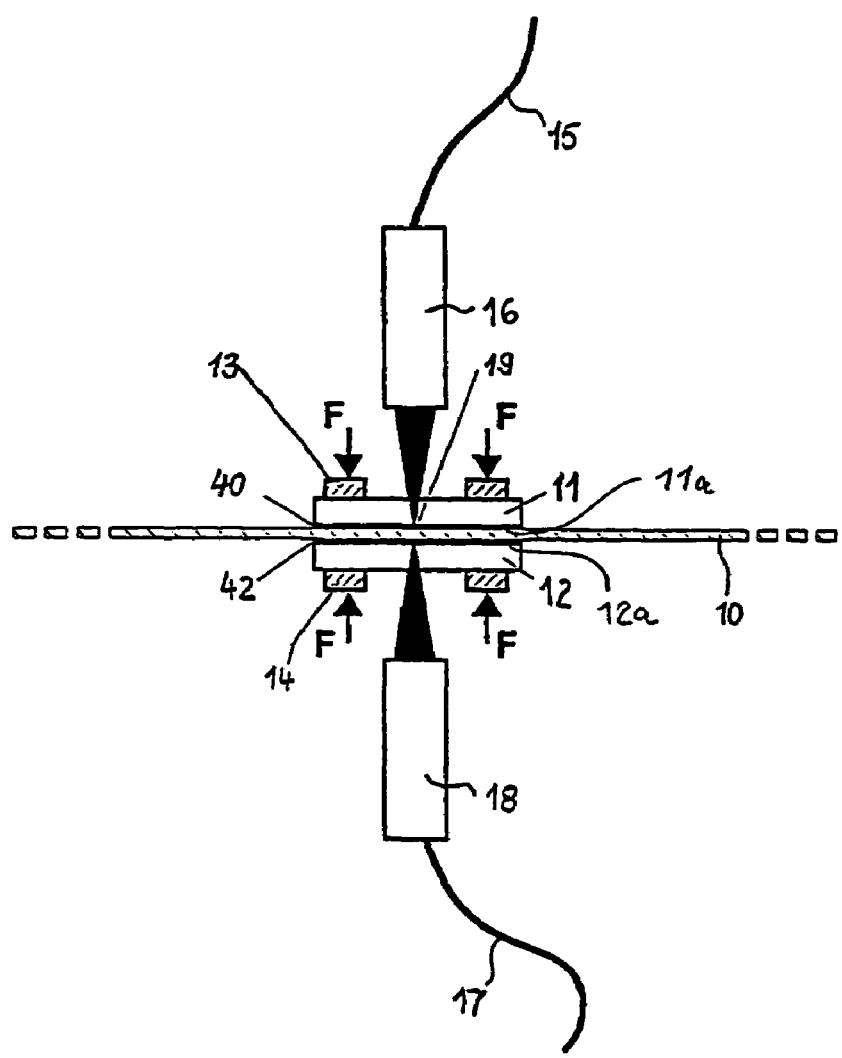
FIG. 4 is a schematic illustration of an inventive device according to FIG. 1 with two absorption devices, as fourth exemplary embodiment.

In the exemplary embodiment according to FIG. 4, wherein identical elements are provided with the same reference characters as in FIG. 1, a respective absorption device 40 and 42 is additionally introduced between plastic film 10 and mounting element 11 and 12. The absorption device 40 is located directly between the mounting element 11 and the plastic film 10 and forms the first pressing surface 11a. The absorption device 42 lies directly between the counter-mounting element 12 and the plastic film 10 and forms the second pressing surface 12a. That side of the absorption device 40 and 42 facing toward the radiation source 16 or, respectively, 18 respectively absorbs the emitted radiant energy and converts it into heat that is transmitted onto the ends of the plastic film 10 residing opposite one another and effects the welding. In this exemplary embodiment, thus, arbitrary thermoplastic material can be employed regardless of the respective absorptivity, for example completely transparent plastic film.

Figure 5:
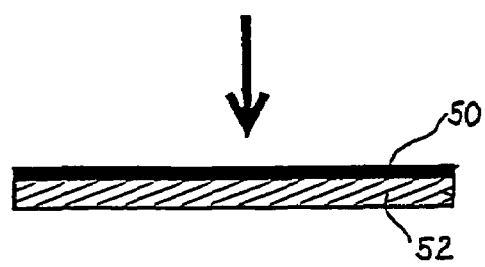
FIG. 5 shows an absorption device composed of CrNi steel sheet having an absorption layer.

In a further exemplary embodiment according to FIG. 5, the absorption device 40 and 42 is composed of a thin metal sheet, for example CrNi sheet steel, that is arranged between the plastic film 10 and the mounting element 11 and 12. That side of the metal sheet 52 facing toward the irradiated side can be roughened for improved absorption or can be provided with an absorbent coating 50, particularly with black chromium or stove enamel.

Figure 6:
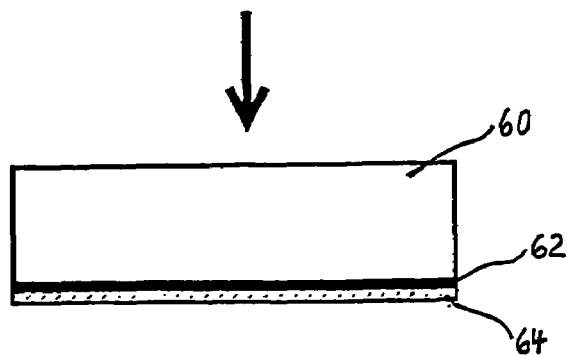
FIG. 6 shows an absorption device with a transparent glass pane, a DLC layer and an anti-adhesion coating.

In the exemplary embodiment according to FIG. 6, the absorption device 40 and 42 is composed of an absorbent layer 62, particularly a hydrophobic DLC layer or a hard-aggregate layer, preferably respectively approximately 0.2-3 µm thick, on a transparent glass pane 60 serving as carrier. The glass pane 60 simultaneously assumes the function of the mounting element 11 or 12 (see FIG. 4). The absorbent layer 62 can be additionally provided with an anti-adhesion layer 64, particularly a DLC coating, Teflon or silicone, preferably having a thickness of approximately 0.5-3 µm, at its side facing away from the radiation. A sticking of the plastic film 10 during the welding process is thus avoided.

The inventive method and the inventive device can be generally applied for all thermoplastics. The employment of polyester, polycarbonate or polyamide is especially beneficial, potentially with absorbent additives for balancing the penetration depth of the radiation to be absorbed. Lampblack-filled polyamide or polycarbonate have thereby proven beneficial. The film thickness lies in the range from 50 to 200 µm.

The inventive method and the inventive device serve for the manufacture of endless photoconductor bands, what are referred to as OPC bands (organic photoconducting material), as well as transfer bands for electrophotographic devices. The weld is very uniform and has the same thickness as the plastic film. As a result thereof, it is also possible to employ the region of the weld as a latent image carrier or as a toner image carrier. An endless band manufactured in this way can therefore have a short length and the wear in the region of the weld is reduced.

The invention claimed is:

1. A method for manufacturing an endless band of plastic for an intermediate carrier band in an electrographic printer or copier, comprising the steps of:
    abutting end faces of ends of a thermoplastic plastic film that has at least a width of a standard printing format;
    arranging respective pressing surfaces at both sides of the abutted ends, said pressing surfaces being of a length at least corresponding to a width of the standard printing format and said pressing surfaces being of a width to receive pressing forces at locations spaced apart from the abutted ends, said pressing surfaces pressing the ends toward one another and pressing onto unmelted portions of the thermoplastic film to define a spacing of the pressing surfaces from one another corresponding to a thickness of the unmelted plastic film;
    heating the abutted ends of the thermoplastic film by radiation to a temperature required for welding the thermoplastic film while said pressing surfaces are pressing on the thermoplastic film so as to produce a weld at the abutted ends;
    maintaining the spacing of said pressing surfaces from one another during said heating step so that the thickness of the unmelted thermoplastic film is preserved at the weld of the abutted ends;
    measuring a temperature of the plastic film at the weld during said heating step; and
    regulating radiation capacity dependent on the measured temperature for keeping the temperature substantially constant.

2. A method for manufacturing an endless band of plastic for an intermediate carrier band in an electrographic printer or copier, comprising the steps of:
    abutting end faces of ends of a thermoplastic plastic film that has at least a width of a standard printing format;
    arranging respective pressing surfaces at both sides of the abutted ends, said pressing surfaces being of a length at least corresponding to a width of the standard printing format and said pressing surfaces being of a width to receive pressing forces at locations spaced apart from the abutted ends, said pressing surfaces pressing the ends toward one another and pressing onto unmelted portions of the thermoplastic film to define a spacing of the pressing surfaces from one another corresponding to a thickness of the unmelted plastic film;

heating the abutted ends of the thermoplastic film by radiation to a temperature required for welding the thermoplastic film while said pressing surfaces are pressing on the thermoplastic film so as to produce a weld at the abutted ends;

maintaining the spacing of said pressing surfaces from one another during said heating step so that the thickness of the unmelted thermoplastic film is preserved at the weld of the abutted ends; and providing an absorption device for absorbing rays on at least one side of the plastic film and lying there against.

3. A method according to claim 2, wherein said absorption device comprises a metal sheet.

4. A method according to claim 3, wherein said metal sheet includes an absorbent coating.

5. A method as claimed in claim 4, wherein said absorbent coating comprises black chromium or stoving enamel.

6. A method as claimed in claim 3, wherein said metal sheet comprises a CrNi steel sheet.

7. A method according to claim 3, wherein a side of the metal sheet facing toward a source of the radiation is roughened.

8. A method according to claim 2, further comprising the step of: providing said absorption device with an absorbent hard-aggregate layer or an absorbent DLC layer.

9. A method as claimed in claim 8, wherein said absorbent layer is of a thickness of 0.2-3 μm.

10. A method according to claim 2, wherein said absorption device lies in direct contact against the plastic film.

11. A method according to claim 2, wherein said absorption device forms the pressing surface.

12. A device for manufacturing an endless band of plastic for an intermediate carrier band in an electrographic printer or copier, comprising:

an apparatus that is mounted and operable to abut end faces of ends of a thermoplastic plastic film that comprises at least a width of a standard printing format against one another;

a radiating source from which radiation is emitted to heat the abutted ends of the plastic film to a temperature required for welding the ends to one another;

respective pressing surfaces, at least one of said pressing surfaces having an anti-adhesive layer thereon arranged at both sides of the ends, a length of said pressing surfaces at least corresponding to the width of the standard printing format and a width of said pressing surfaces extending longitudinally to each side of the abutted ends to cool portions of the plastic film to receive pressing forces at locations spaced from the abutted ends and pressing the pressing surfaces against the plastic material to define a spacing of the pressing surfaces corresponding to a thickness of the unmelted plastic film;

a temperature measuring apparatus operable to measure a temperature of the plastic at the weld during welding; and a control operable to regulate radiation capacity dependent on the measured temperature for keeping the temperature substantially constant.

13. A device for manufacturing an endless band of plastic for an intermediate carrier band in an electrographic printer or copier, comprising:

an apparatus that is mounted and operable to abut end faces of ends of a thermoplastic plastic film that comprises at least a width of a standard printing format against one another;

a radiating source from which radiation is emitted to heat the abutted ends of the plastic film to a temperature required for welding the ends to one another;

respective pressing surfaces, at least one of said pressing surfaces having an anti-adhesive layer thereon arranged at both sides of the ends, a length of said pressing surfaces at least corresponding to the width of the standard printing format and a width of said pressing surfaces extending longitudinally to each side of the abutted ends to cool portions of the plastic film to receive pressing forces at locations spaced from the abutted ends and pressing the pressing surfaces against the plastic material to define a spacing of the pressing surfaces corresponding to a thickness of the unmelted plastic film; and an absorption device for absorbing rays provided on at least one side of the plastic film and lying there against.

14. A device according to claim 13, wherein said absorption device comprises a metal sheet.

15. A device according to claim 14, wherein said metal sheet includes an absorbent coating.

16. A device according to claim 15, wherein said absorbent coating comprises black chromium or stoving enamel.

17. A device as claimed in claim 14, wherein said metal sheet comprises a CrNi steel sheet.

18. A device according to claim 14, wherein a side of said metal sheet facing toward the radiation source is roughened.

19. A device according to claim 13, wherein said absorption device is provided with an absorbent hard-aggregate layer or an absorbent DLC layer.

20. A device as claimed in claim 19, wherein said layer includes an anti-adhesion layer having a thickness of 0.5-3 μm.

21. A device as claimed in claim 20, wherein said anti-adhesion layer is applied onto the absorption device.

22. A device as claimed in claim 19, wherein said layer has a thickness of 0.2-3 μm.

23. A device according to claim 13, wherein said absorption device lies in direct contact against the plastic film.

24. A device according to claim 13, wherein said absorption device forms said pressing surface.

* * * * *